June 23, 1959
A. L. SCHULS
2,891,275
FISH HOLDERS
Original Filed Sept. 2, 1954
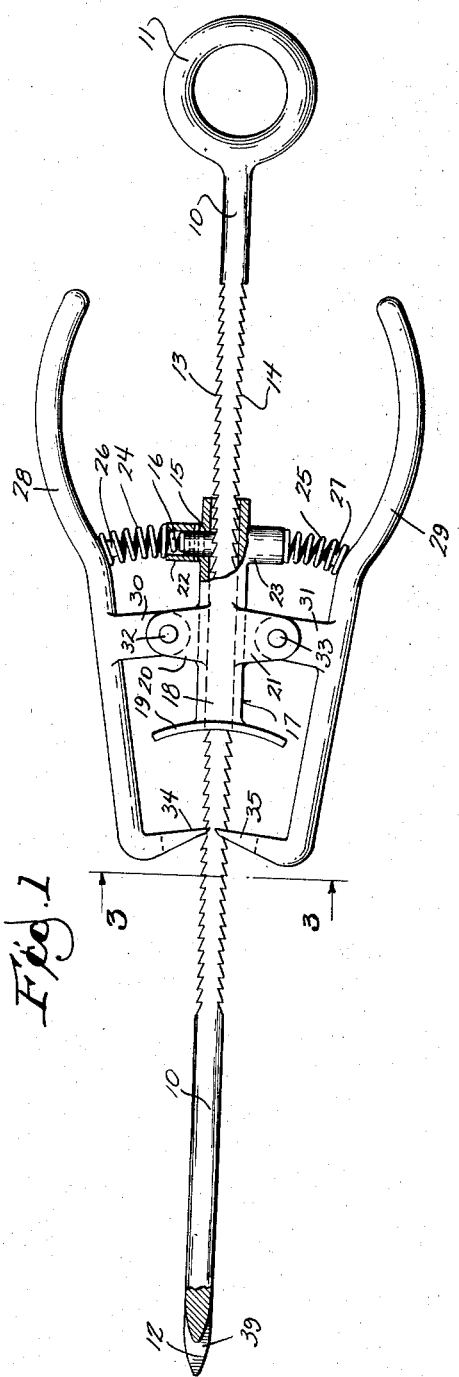
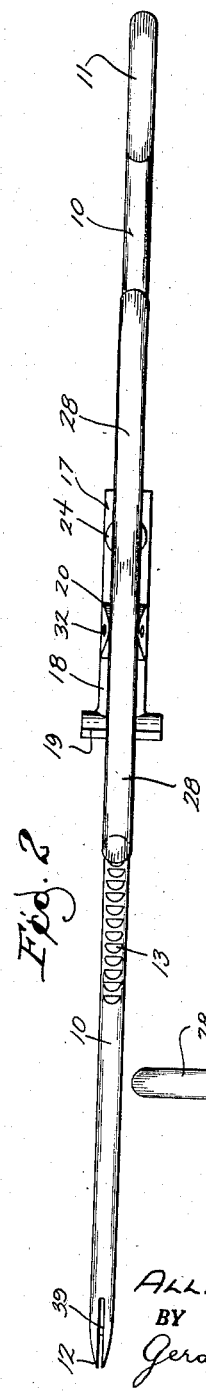
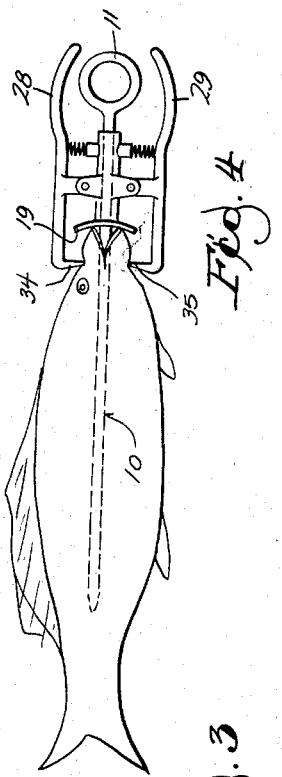
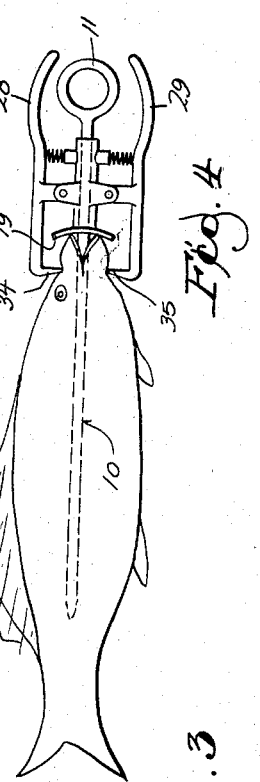
INVENTOR.
ALLIE LEE SCHULS
BY
Gerald P. Welch
ATTORNEY

United States Patent Office 2,891,275
Patented June 23, 1959

2,891,275
FISH HOLDERS

Allie L. Schuls, South Milwaukee, Wis.

Substituted for abandoned application Serial No. 453,728, September 2, 1954. This application January 19, 1959, Serial No. 788,027

1 Claim. (Cl. 17—8)

This application is a substitute application for my application Serial No. 453,728, filed September 2, 1954, now abandoned.

This invention relates to improvements in fish holders, and more particularly to a novel fish holder of the clamping type.

An object of the invention is to provide a device of the type which will include a means for impaling a fish to be cleaned and clamping means for retaining said fish on the impaling element.

Another object of the invention is to provide clamping means on a device of the type which will be kept engaged by a plurality of springs. Similar devices of the type now in use require constant hand pressure of the user to maintain the clamping means in engagement.

Other and further objects of the invention will appear as the description proceeds, reference being had to the accompanying drawings, in which:

Fig. 1 is a plan view of a fish holder embodying the invention with part of the slotted point and the central tubular portion broken away.

Fig. 2 is an edge view thereof.

Fig. 3 is an enlarged view taken on line 3—3 of Fig. 1.

Fig. 4 is a plan view of the device with a fish held thereon.

Referring more particularly to the drawings, the numeral 10 refers to an elongated rod having a handle eye 11 at one end thereof and a slotted point 12 at the other. The rod 10 has oppositely disposed racks 13 and 14, one of which may be engaged by the stop 15 which is urged thereagainst by the coil spring 16. A frame 17 includes the central tubular portion 18 having an end plate 19, the pivot arms 20 and 21, and the sleeve members 22 and 23, housing, respectively, the coil springs 24 and 25, which latter engage with their outer end and the studs 26 and 27 on the handle members 28 and 29. The arms 30 and 31 are integrally formed with the handles 28 and 29 and are pivoted at 32 and 33 to the pivot arms 20 and 21. The handle members 28 and 29 terminate in opposed jaws 34 and 35, each of which has a V-shaped separation as at 36 to form two points 37 and 38.

The slot at 39 of the rod point 12 may be engaged on a fish line and the point moved down interiorly of a fish to release the fish hook.

In use, the rod point 12 is passed down through the mouth of the fish and the frame 17 is adjusted manually to a point on the rod where the jaws 34 and 35 will catch the fish adjacent the head in an appropriate position for retention thereof. The relative adjustment of the frame and rod is accomplished by rotating the rod on its axis to disengage the rack and detent. The coil springs 24 and 25 will maintain the jaws 34 and 35 with a gripping tension.

It will be understood that the device is capable of many modifications in structure and design, without departing from the spirit of the invention, within the scope of the appended claim.

Having thus described the invention, what is claimed and desired to be secured by Letters Patent of the United States, is:

A fish holder including a relatively short tubular frame element, an arcuate face plate surrounding one open end thereof, an elongated rod for impaling a fish to be cleaned longitudinally movable through said frame element and rotatable on a longitudinal axis therein, a pair of racks disposed oppositely longitudinally on said rod, a spring detent notched to engage either of said racks movable at right angles to the rod, a pair of oppositely disposed pivot arms on said frame, a pair of elongated arms pivoted thereto each comprised of a handle at one end, an inturned notched jaw on the other end of each elongated arm, whereby compression of the handles will spread said jaws, and spring means on the frame for urging said jaws together to retain the head of a fish impaled on said rod against said face plate.

References Cited in the file of this patent

UNITED STATES PATENTS

| 2,015,262 | Flagg et al. | Sept. 24, 1935 |
| 2,298,580 | Miron | Oct. 13, 1942 |
| 2,603,829 | Siskoff | July 22, 1952 |

FOREIGN PATENTS

| 45,794 | Sweden | Sept. 20, 1919 |